(12) United States Patent
Matsusue

(10) Patent No.: US 11,441,243 B2
(45) Date of Patent: *Sep. 13, 2022

(54) FINE CELLULOSE FIBER AND METHOD FOR PRODUCING SAME

(71) Applicant: Daio Paper Corporation, Ehime (JP)

(72) Inventor: Ikko Matsusue, Ehime (JP)

(73) Assignee: Daio Paper Corporation, Ehime (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/609,984

(22) PCT Filed: May 8, 2018

(86) PCT No.: PCT/JP2018/017728
§ 371 (c)(1),
(2) Date: Oct. 31, 2019

(87) PCT Pub. No.: WO2018/212012
PCT Pub. Date: Nov. 22, 2018

(65) Prior Publication Data
US 2020/0063292 A1 Feb. 27, 2020

(30) Foreign Application Priority Data
May 15, 2017 (JP) .............................. JP2017-096471

(51) Int. Cl.
| | | |
|---|---|---|
| *C08B 15/06* | (2006.01) | |
| *D01F 2/00* | (2006.01) | |
| *C08B 7/00* | (2006.01) | |
| *D01F 1/10* | (2006.01) | |
| *D21H 11/18* | (2006.01) | |

(52) U.S. Cl.
CPC ............... *D01F 2/00* (2013.01); *C08B 7/00* (2013.01); *C08B 15/06* (2013.01); *D01F 1/10* (2013.01); *D21H 11/18* (2013.01)

(58) Field of Classification Search
CPC ................................. C08B 15/06; C08B 7/00
See application file for complete search history.

(56) References Cited

U.S. PATENT DOCUMENTS

| | | | | |
|---|---|---|---|---|
| 10,975,518 | B2 * | 4/2021 | Matsusue | D21C 9/007 |
| 11,053,324 | B2 * | 7/2021 | Noguchi | D21H 13/06 |

FOREIGN PATENT DOCUMENTS

| | | | | |
|---|---|---|---|---|
| CN | 106661840 | | 5/2017 | |
| CN | 110291249 | | 9/2019 | |
| DE | 19910105 | A1 * | 9/2000 | ............... C08L 1/08 |
| EP | 3150762 | | 4/2017 | |
| EP | 3438132 | | 2/2019 | |
| EP | 3617287 | | 3/2020 | |
| JP | 46-010551 | | 3/1971 | |
| JP | 2001-019701 | | 1/2001 | |
| JP | 2009-293167 | | 12/2009 | |
| JP | 2010-216021 | | 9/2010 | |
| JP | 2013-127141 | | 6/2013 | |
| JP | 2015-189698 | | 11/2015 | |
| JP | 2017-002231 | | 1/2017 | |
| JP | 2017-066272 | | 4/2017 | |
| WO | 2014-185505 | | 11/2014 | |

OTHER PUBLICATIONS

Yurkshtovich, N.K. et al., "Complexing of Chromium (III) and Aluminum (III) Cations with Phosphorus-Containing Cellulose-Based Fibrous Sorbent", Russian Journal of Applied Chemistry, 2009, col. 82, No. 6, pp. 963-967, ISSN: 1070-4272, table 1.
International Search Report for PCT/JP2018/017728, dated Jul. 24, 2018.
Extended European Search Report for European Patent Application No. 18801567.1, dated Jan. 20, 2021.
Office Action issued in Corresponding Chinese Patent Application No. 201880026310, dated Apr. 21, 2021.

\* cited by examiner

*Primary Examiner* — Leigh C Maier
*Assistant Examiner* — Everett White
(74) *Attorney, Agent, or Firm* — Andrus Intellectual Property Law, LLP

(57) ABSTRACT

Fine cellulose fiber has a dispersion with a very high transparency and viscosity. A method is for producing the fine cellulose fiber. In the cellulose fiber, a part of hydroxy groups of cellulose fiber is substituted with a predetermined functional group to introduce an ester of phosphorus-oxo acid, and substituted with a carbamate group to introduce a carbamate. The method for producing fine cellulose fiber includes adding an additive (A) and an additive (B) including at least one of urea and a urea derivative to cellulose fiber, heating the mixture at 100 to 210° C., washing the mixture, and then fibrillating the mixture, the additive (B) being added in an amount of 0.01 to 100 mol based on 1 mol of the additive (A).

4 Claims, No Drawings

FINE CELLULOSE FIBER AND METHOD FOR PRODUCING SAME

CROSS-REFERENCE TO RELATED APPLICATIONS

This application is the U.S. national stage application of International Application PCT/JP2018/017728, filed May 8, 2018, which international application was published on Nov. 22, 2018, as International Publication WO 2018/212012 in the Japanese language. The International Application claims priority of Japanese Patent Application No. 2017-096471, filed May 15, 2017. The international application and Japanese application are both incorporated herein by reference, in entirety.

TECHNICAL FIELD

The present invention relates to fine cellulose fiber, and a method for producing the fine cellulose fiber.

BACKGROUND ART

Recently, as natural fiber, fine cellulose fiber having a fiber width of 1 μm or less (cellulose nanofiber (CNF)) has existed in addition to cellulose fiber having a fiber width of about 20 to 30 μm. The fine cellulose fiber is generally obtained by fibrillating cellulose fiber. At present, various proposals have been made to effectively fibrate cellulose fiber.

For example, Patent Literature 1 suggests that fine cellulose fiber with little fiber damage is obtained by performing stirring with a blender to mechanically fibrillate cellulose fiber (form cellulose fiber into fine fiber), but for obtaining a dispersion having higher transparency, the blender treatment time is lengthened, leading to an increase in fiber damage. Patent Literature 2 suggests a method in which prior to fibrillation, "a polybasic acid anhydride is half-esterified, and carboxyl groups are introduced into cellulose at some of hydroxyl groups to prepare polybasic acid half-esterified cellulose". However, it is considered that even in this method, the cellulose fiber cannot be sufficiently miniaturized by subsequent fibrillation.

Thus, Patent Literature 3 suggests a method in which "a fiber raw material containing cellulose is treated with at least one compound selected from a phosphorus oxoacid or a salt thereof while the fiber raw material is heated at 100 to 170° C.". Patent Literature 3 indicates that by the method, "some of hydroxy groups of cellulose having a fiber width of 1 to 1,000 nm and forming the fiber are substituted with a predetermined functional group to obtain fine fibrous cellulose containing phosphorus-oxo groups". However, the fine fibrous cellulose dispersion according to this method has room for improvement in terms of transparency and viscosity.

CITATION LIST

Patent Literature

Patent Literature 1: JP 2010-216021 A
Patent Literature 2: JP 2009-293167 A
Patent Literature 3: JP 2013-127141 A

SUMMARY OF INVENTION

Technical Problem

An object of the present invention is to provide fine cellulose fiber, the dispersion of which has very high transparency and viscosity when formed into a dispersion, and a method for producing the fine cellulose fiber.

Solution to Problem

Means for achieving the above-described object is fine cellulose fiber in which a part of hydroxy groups of cellulose fiber are substituted with a functional group represented by the following structural formula (1) to introduce an ester of phosphorus-oxo acid, and substituted with a carbamate group to introduce a carbamate.

[Structural formula (1)]

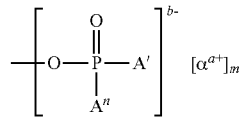

In structural formula 1, a, b, m and n are natural numbers.

At least one of A1, A2, ..., An and A' is O$^-$, and the rest are any of R, OR, NHR and none. R is one of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, an aromatic group and a derivative group thereof. α is a cation of an organic substance or an inorganic substance.

Further, means for achieving the above-described object is a method for producing fine cellulose fiber, the method including adding an additive (A) and an additive (B) including at least one of urea and a urea derivative to cellulose fiber, heating the mixture at 100 to 210° C., washing the mixture, and then fibrillating the mixture, the additive (B) being added in an amount of 0.01 to 100 mol based on 1 mol of the additive (A).

Advantageous Effects of Invention

The present invention provides fine cellulose fiber, the dispersion of which has very high transparency and viscosity, and a method for producing the fine cellulose fiber.

DESCRIPTION OF EMBODIMENTS

An embodiment of the present invention will now be described. This embodiment is an example of the present invention.

(Fine Cellulose Fiber)

The fine cellulose fiber of this embodiment is one in which some of hydroxy groups (—OH groups) of cellulose fiber are substituted with a functional group represented by the following structural formula (1) to introduce (modify the cellulose fiber with) an ester of phosphorus-oxo acid (esterify the cellulose fiber). In addition, the cellulose fiber of this embodiment is one in which some of hydroxyl groups of the cellulose fiber are substituted with a carbamate group to introduce a carbamate (an ester of carbamic acid).

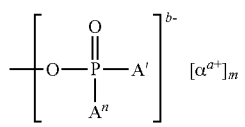

[Structural formula (1)]

In structural formula 1, a, b, m and n are natural numbers.

At least one of A1, A2, . . . , An and A' is O⁻, and the rest are any of R, OR, NHR and none. R is one of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, an aromatic group and a derivative group thereof. α is a cation of an organic substance or an inorganic substance.

The ester of phosphorus-oxo acid is a compound in which a hydroxyl group (hydroxy group) (—OH) and an oxo group (=O) are bonded to a phosphorus atom, and the hydroxyl group gives an acidic proton. The ester of phosphorus-oxo acid has high negative charge, and therefore, when the ester of phosphorous-oxo acid is introduced, repulsion between cellulose molecules is intensified, so that cellulose fiber is easily fibrillated. In addition, when a carbamate is introduced together with the ester of phosphorus-oxo acid, the transparency and the viscosity of the dispersion are extremely improved. In this respect, the carbamate has an amino group. Therefore, when the carbamate is introduced, the carbamate interacts with the ester of phosphorous-oxo acid. Therefore, when the carbamate is also introduced, the shearing force of the dispersion may be increased, leading to improvement of the viscosity.

The ester of phosphorus-oxo acid to be introduced is more preferably an ester of phosphorous acid. When the ester of phosphorous acid is introduced, yellowing is reduced, and the transparency of the dispersion of fine cellulose fiber is improved. In addition, the viscosity is increased. When the ester of phosphorous acid is introduced, some of hydroxy groups (—OH groups) of cellulose fiber are substituted with a functional group represented by the following structural formula (2).

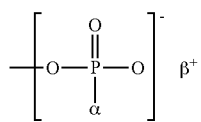

[Structural Formula (2)]

In structural formula (2), α is any of none, R and NHR. R is one of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, an aromatic group and a derivative group thereof. β is a cation of an organic substance or an inorganic substance.

The introduction amount of the ester of phosphorus-oxo acid is preferably 0.06 to 3.94 mmol, more preferably 0.47 to 2.54 mmol, per 1 g of fine cellulose fiber. When the introduction amount is less than 0.06 mmol, there is the possibility that it is not easy to fibrillate cellulose fiber. In addition, the aqueous dispersion of fine cellulose fiber may be unstable. On the other hand, when the introduction amount is more than 3.94 mmol, cellulose fiber may be dissolved in water.

The introduction amount of the ester of phosphorus-oxo acid is a value evaluated on the basis of results of elemental analysis. For the elemental analysis, X-Max 50 001 manufactured by HORIBA, Ltd. is used.

The introduction amount of the carbamate is preferably 0.06 to 2.34 mmol, more preferably 0.15 to 1.28 mmol, and especially preferably 0.21 to 0.94 mmol, per 1 g of fine cellulose fiber. When the introduction amount is less than 0.06 mmol, there is the possibility that the transparency and the viscosity of the dispersion are not sufficiently improved. On the other hand, when the introduction amount is more than 2.34 mmol, cellulose fiber may be dissolved in water. The method for calculating the introduction amount of the carbamate is based on the Kjeldahl method.

The degree of substitution (DS) with the functional group represented by the structural formula (1) is preferably 0.01 to 0.64, more preferably 0.08 to 0.41. When the degree of substitution is less than 0.01, there is the possibility that it is not easy to fibrillate cellulose fiber. On the other hand, when the degree of substitution is more than 0.64, cellulose fiber may be dissolved in water.

The degree of substitution with the carbamate group is preferably 0.01 to 0.38, more preferably 0.02 to 0.21, especially preferably 0.03 to 0.15. When the degree of substitution is less than 0.01, there is the possibility that the transparency and the viscosity are not sufficiently improved. On the other hand, when the degree of substitution is more than 0.38, cellulose fiber may be dissolved in water.

The degree of substitution refers to an average number of substitutions with a functional group (a functional group represented by structural formula (1), or a carbamate group) on one glucose unit in cellulose. The degree of substitution can be controlled, for example, by the reaction temperature or the reaction time. When the reaction temperature is elevated, or the reaction time is lengthened, the degree of substitution is increased. However, when the degree of substitution is excessively increased, the degree of polymerization of cellulose is significantly reduced.

The fiber width (average diameter of monofilaments) of fine cellulose fiber is preferably 1 to 1,000 nm, more preferably 2 to 400 nm, especially preferably 3 to 100 nm. When the fiber width is less than 1 nm, there is the possibility that cellulose is dissolved in water, so that physical properties as fine cellulose fiber, such as strength, rigidity and dimensional stability are not exhibited. On the other hand, when the fiber width is more than 1,000 nm, the fiber is not fine cellulose fiber, but ordinary cellulose fiber. In addition, when the fiber width is more than 1,000 nm, the fiber width is about 1/10 times the wavelength of visible light, and therefore there is the possibility that when fine cellulose fiber is dispersed in water (when the fiber is formed into an aqueous dispersion), visible light is refracted and scattered, so that the transparency is considered insufficient.

The fiber width of fine cellulose fiber is measured in the following manner using an electron microscope.

First, 100 ml of an aqueous dispersion of fine cellulose fiber having a solid concentration of 0.01 to 0.1% by mass is filtered through a Teflon (registered trademark) membrane filter, and solvent substitution is performed once with 100 ml of ethanol and 3 times with 20 ml of t-butanol. Next, the fine cellulose fiber is freeze-dried, and coated with osmium to obtain a sample. This sample is observed with an electron microscope SEM image at a magnification of 5,000 times, 10,000 times or 30,000 times depending on the width of the constituent fiber. In this observation, two diagonals are drawn in the observation image, and further, three straight lines passing through the intersection of the diagonals are arbitrarily drawn. The widths of a total of 100 filaments intersecting the three straight lines are visually measured. The median diameter of the measured values is defined as a fiber width.

The axial ratio (fiber length/fiber width) of fine cellulose fiber is preferably 3 to 1,000,000, more preferably 6 to 340,000, especially preferably 10 to 340,000. When the axial ratio is less than 3, the fine cellulose fiber is no longer fibrous. On the other hand, when the axial ratio is more than 1,000,000, the viscosity of the dispersion (slurry) may be excessively high.

The crystallinity of fine cellulose fiber is preferably 50 to 100%, more preferably 60 to 90%, especially preferably 65 to 85%. When the degree of crystallinity is less than 50%, strength and heat resistance may be considered insufficient. The degree of crystallinity can be adjusted by, for example, selection of pulp fiber, pretreatment, fibrillation or the like. The degree of crystallinity is a value measured by the X-ray diffraction method in accordance with JIS-K0131 (1996), "General Rule of X-Ray Diffraction Analysis". In addition, fine cellulose fiber has an amorphous part and a crystalline part, and the degree of crystallinity means a ratio of the crystalline part to the entire fine cellulose fiber.

The light transmittance of fine cellulose fiber (solution having a solid content of 0.2%) is preferably 40.0% or more, more preferably 60.0% or more, especially preferably 70.0% or more. When the light transmittance is less than 40.0%, the transparency may be considered insufficient. The light transmittance of fine cellulose fiber can be adjusted by, for example, selection of pulp fiber, pretreatment, fibrillation or the like.

The light transmittance is a value obtained by measuring the transparency (transmittance of light having a wavelength of 350 to 880 nm) of a 0.2% (w/v) fine cellulose fiber dispersion using a Spectrophotometer U-2910 (Hitachi, Ltd.).

The B-type viscosity of a dispersion having a fine cellulose fiber concentration of 1% by mass (w/w) is preferably 10 to 300,000 cps, more preferably 1,000 to 200,000 cps, especially preferably 10,000 to 100,000 cps. The B-type viscosity is a value obtained by performing measurement in accordance with JIS-Z8803 (2011), "Method for Measurement of Viscosity of Liquid", for a fine cellulose fiber aqueous dispersion having a solid content of 1%. The B-type viscosity is a resistance torque in stirring of a slurry, and a higher B-type viscosity means a larger amount of energy required for stirring.

(Method for Producing Fine Cellulose Fiber)

In the production method of this embodiment, the additive (A) and the additive (B) are added, and the mixture is heated to introduce an ester of phosphorus-oxo acid and a carbamate into cellulose fiber. The cellulose fiber containing the ester of phosphorus-oxo acid and the carbamate is washed, and then fibrillated to obtain fine cellulose fiber.

(Cellulose Fiber)

As cellulose fiber, plant-derived fiber (plant fiber), animal-derived fiber, microorganism-derived fiber, and the like can be used. Such fiber can be used alone or in combination of two or more kinds thereof as necessary. It is to be noted that the cellulose fiber is preferably plant fiber, more preferably pulp fiber which is a kind of plant fiber. When the cellulose fiber is pulp fiber, it is easy to adjust the physical properties of fine cellulose fiber.

As plant fiber, for example, wood pulp made from hardwood, softwood and the like, non-wood pulp made from straw, bagasse and the like, waste paper pulp (DIP) made from waste paper, damaged paper and the like can be used. These fibers can be used alone or in combination of two or more thereof.

As wood pulp, for example, chemical pulp such as hardwood kraft pulp (LKP) and softwood kraft pulp (NKP), and mechanical pulp (TMP), waste paper pulp (DIP) and the like can be used. These pulps can be used alone or in combination of two or more thereof.

The hardwood kraft pulp (LKP) may be leaf bleached kraft pulp, leaf non-bleached kraft pulp or leaf semi-bleached kraft pulp. The softwood kraft pulp (NKP) may be softwood needle bleached kraft pulp, needle non-bleached kraft pulp or needle semi-bleached kraft pulp. The waste paper pulp (DIP) may be any of magazine waste paper pulp (MDIP), newspaper waste paper pulp (NDIP), corrugated waste paper pulp (WP) and other waste paper pulp.

(Additive (A))

The additive (A) is at least one of a phosphorus-oxo acid and a phosphorus-oxo acid metal salt. The additive (A) includes phosphoric acid, ammonium dihydrogen phosphate, diammonium hydrogen phosphate, triammonium phosphate, ammonium pyrophosphate, ammonium polyphosphate, lithium dihydrogen phosphate, trilithium phosphate, dilithium hydrogen phosphate, lithium pyrophosphate, lithium polyphosphate, sodium dihydrogen phosphate, disodium hydrogen phosphate, trisodium phosphate, sodium pyrophosphate, sodium polyphosphate, potassium dihydrogen phosphate, dipotassium hydrogen phosphate, tripotassium phosphate, potassium pyrophosphate, potassium polyphosphate, and phosphorous acid compounds such as phosphorous acid, sodium hydrogen phosphite, ammonium hydrogen phosphite, potassium hydrogen phosphite, sodium dihydrogen phosphite, sodium phosphite, lithium phosphite, potassium phosphite, magnesium phosphite, calcium phosphite, triethyl phosphite, triphenyl phosphite and pyrophosphorous acid. These phosphoric acids and phosphoric acid metal salts, phosphorous acids or phosphorous acid metal salts can be used alone or in combination of two or more thereof. It is preferable to use sodium hydrogen phosphate or sodium hydrogen phosphite. In addition, it is more preferable to use phosphorous acids or metal phosphites because yellowing of cellulose fiber is prevented.

In addition of the additive (A), cellulose fiber may be in a dry state, a wet state or a slurry state. The additive (A) may be in the form of powder or in the form of an aqueous solution. It is preferable to add the additive (A) in the form of an aqueous solution to cellulose fiber in a dry state because high reaction uniformity is obtained.

The addition amount of additive (A) is preferably 1 to 10,000 g, more preferably 100 to 5,000 g, especially preferably 300 to 1,500 g, based on 1 kg of cellulose fiber. When the addition amount is less than 1 g, there is the possibility that an effect adding the additive (A) is not obtained. On the other hand, even when the addition amount is more than 10,000 g, the effect of adding the additive (A) may no longer be enhanced.

(Additive (B))

The additive (B) is composed of at least one of urea and a urea derivative. As the additive (B), for example, urea, thiourea, biuret, phenylurea, benzylurea, dimethylurea, diethylurea and tetramethylurea can be used. The urea or urea derivatives can be used alone or in combination of two or more thereof. It is preferable to use urea.

When heated, the additive (B) is decomposed into isocyanic acid and ammonia as shown in the following reaction formula (1). Isocyanic acid is very reactive, and forms a hydroxyl group of cellulose and a carbamate as shown in the following reaction formula (2).

(1)

(2)

The addition amount of the additive (B) is preferably 0.01 to 100 mol, more preferably 0.2 to 20 mol, especially preferably 0.5 to 10 mol, based on 1 mol of the additive (A). When the addition amount is less than 0.01 mol, there is the possibility that the carbamate is not sufficiently introduced into cellulose fiber, and the cellulose fiber is not easily fibrillated. On the other hand, even when the addition amount is more than 100 mol, the effect of adding urea may no longer be enhanced.

(Heating)

The heating temperature in heating of cellulose fiber containing the additive (A) and the additive (B) is preferably 100 to 210° C., more preferably 100 to 200° C., especially preferably 100 to 160° C. When the heating temperature is 100° C. or higher, an ester of phosphorus-oxo acid can be introduced. However, when the heating temperature is higher than 210° C., cellulose may be rapidly degraded, resulting in coloring and reduction of viscosity. When the heating temperature is higher than 160° C., the B-type viscosity of fine cellulose fiber may be reduced, and the light transmittance may be reduced.

The pH in heating of cellulose fiber containing the additive (A) and the additive (B) is preferably 3 to 12, more preferably 4 to 11, especially preferably 6 to 9. The lower the pH, the easier the introduction of an ester of phosphorus-oxo acid and a carbamate becomes. However, when the pH is less than 3, cellulose may be rapidly degraded.

It is preferable that Heating of cellulose fiber containing the additive (A) and the additive (B) is performed until the cellulose fiber is dried. Specifically, the cellulose fiber is dried until the moisture content of the cellulose fiber is preferably 10% or less, more preferably 0.1% or less, especially preferably 0.001% or less. Of course, the cellulose fiber may be in a dry state without moisture.

The time for heating cellulose fiber containing the additive (A) and the additive (B) is, for example, 1 to 1,440 minutes, preferably 10 to 180 minutes, more preferably 30 to 120 minutes. When the heating time is excessively long, introduction of an ester of phosphorus-oxo acid or a carbamate may excessively progress. In addition, when the heating time is excessively long, the cellulose fiber may be yellowed.

As an apparatus for heating cellulose fiber containing the additive (A) and the additive (B), for example, a hot air dryer, a kiln, a heating kneader, a paper making machine, a dry pulp machine, or the like can be used.

(Pretreatment)

Prior to introduction of an ester of phosphorus-oxo acid and a carbamate, or after introduction of an ester of phosphorus-oxo acid and a carbamate into cellulose fiber, the cellulose fiber can be subjected to pretreatment such as beating if necessary. By pretreating the pulp fiber prior to fibrillation of cellulose fiber, the number of fibrillations can be significantly decreased, so that energy for fibrillation can be reduced.

The pretreatment of cellulose fiber can be performed by a physical method or a chemical method, preferably a physical method and a chemical method. Pretreatment by a physical method and pretreatment by a chemical method may be performed either in parallel or separately.

It is preferable to employ beating as pretreatment by a physical method. When cellulose fiber is beaten, cellulose fiber is cut to an even length. Therefore, entanglement of cellulose filaments is prevented (prevention of cohesion). From this viewpoint, beating is performed until the freeness of cellulose fiber is preferably 700 ml or less, more preferably 500 ml or less, especially preferably 300 ml or less. The freeness of cellulose fiber is a value obtained by performing measurement in accordance with JIS P8121-2 (2012). Further, beating can be performed using, for example, a refiner or a beater.

Examples of the pretreatment by a chemical method include hydrolysis of a polysaccharide with an acid (acid treatment), hydrolysis of a polysaccharide with an enzyme (enzyme treatment), swelling of a polysaccharide with an alkali (alkali treatment), oxidation of a polysaccharide with an oxidizing agent (oxidation treatment), and reduction (reduction treatment) of a polysaccharide with a reducing agent. As pretreatment by a chemical method, it is preferable to perform enzyme treatment, and it is more preferable to additionally perform one or more selected from acid treatment, alkali treatment and oxidation treatment. Hereinafter, enzyme treatment and alkali treatment will be described in this order.

It is preferable to use at least one of a cellulase-based enzyme and a hemicellulase-based enzyme, and it is more preferable to use both the enzymes in combination as the enzyme to be used for enzyme treatment. The use of these enzymes facilitates fibrillation of cellulose fiber. A cellulase-based enzyme causes decomposition of cellulose in the presence of water. In addition, a hemicellulase-based enzyme causes decomposition of hemicellulose in the presence of water.

As the cellulase-based enzyme, enzymes produced by *Trichoderma* (filamentous fungus), *Acremonium* (filamentous fungus), *Aspergillus* (filamentous fungus), *Phanerochaete* (basidiomycete), *Trametes* (basidiomycete), *Humicola* (filamentous fungus), *Bacillus* (bacteria), *Schizophyllum* (basidiomycete) and *Streptomyces* (bacteria), *Pseudomonas* (bacteria) and the like can be used. These cellulase-based enzymes can be purchased as reagents or commercially available products. Examples of the commercially available products include Cellulosin T2 (manufactured by HIB Enzymes Inc.), Meicelase (manufactured by Meiji Seika Kaisha, Limited), Novozymes 188 (manufactured by Novozymes A/S), Multifect CX10L (manufactured by Genencor Company), and Cellulase-Based Enzyme GC220 (manufactured by Genencor Company).

In addition, as the cellulase-based enzyme, either EG (endoglucanase) or CBH (cellobiohydrolase) can be used. EG and CBH may be used alone or in combination thereof. The cellulase-based enzyme may be used in combination with a hemicellulase-based enzyme.

As the hemicellulase-based enzyme, for example, xylanase being an enzyme which degrades xylan, mannase being an enzyme which degrades mannan, and arabanase being an enzyme which degrades araban can be used. Pectinase being an enzyme which degrades pectin can also be used.

Hemicellulose is a polysaccharide other than pectin present between cellulose microfibrils of plant cell walls. Hemicellulose is diverse and varies depending on a wood kind and a cell wall layer. On the secondary wall of softwood, glucomannan is a main component, and on the secondary wall of hardwood, 4-O-methylglucuronoxylan is a main component. Thus, when fine cellulose fiber is to be obtained from needle bleached kraft pulp (NBKP), it is preferable to use mannase. In addition, when fine cellulose fiber is to be obtained from leaf bleached kraft pulp (LBKP), it is preferable to use xylanase.

The addition amount of the enzyme based on the amount of cellulose fiber is determined according to, for example, the kind of enzyme, the kind of wood (softwood or hardwood) used as a raw material or the kind of mechanical pulp. However, the addition amount of the enzyme based on the amount of cellulose fiber is preferably 0.1 to 3% by mass, more preferably 0.3 to 2.5% by mass, especially preferably 0.5 to 2% by mass. When the addition amount of the enzyme is less than 0.1% by mass, there is the possibility that a sufficient effect of adding the enzyme is not obtained. On the other hand, when the addition amount of the enzyme is more than 3% by mass, cellulose may be saccharified, leading to reduction of the yield of fine cellulose fiber. In addition, improvement of the effect, which matches an increase in addition amount, cannot be achieved.

When a cellulase-based enzyme is used as the enzyme, the pH at the time of enzyme treatment is preferably within a weak acidity range (pH=3.0 to 6.9) from the viewpoint of enzyme reactivity. On the other hand, when a hemicellulase-based enzyme is used as the enzyme, the pH at the time of enzyme treatment is preferably in a weak alkalinity range (pH=7.1 to 10.0).

Irrespective of whether a cellulase enzyme or a hemicellulase enzyme is used as the enzyme, the temperature at the time of enzyme treatment is preferably 30 to 70° C., more preferably 35 to 65° C., especially preferably 40 to 60° C. When the temperature at the time of enzyme treatment is 30° C. or higher, the enzyme activity is hardly reduced, so that an increase in treatment time can be prevented. On the other hand, when the temperature at the time of enzyme treatment is 70° C. or lower, inactivation of the enzyme can be prevented.

The time for enzyme treatment is determined according to, for example, the kind of enzyme, the temperature for enzyme treatment, and the pH at the time of enzyme treatment. It is to be noted that the time for enzyme treatment is generally 0.5 to 24 hours.

It is preferable to inactivate the enzyme after enzyme treatment is performed. Examples of the method for inactivating the enzyme include a method in which an alkaline aqueous solution (the pH of which is preferably 10 or more, more preferably 11 or more) is added; and a method in which hot water at 80 to 100° C. hot water is added.

A method for the above-described alkali treatment will now be described.

Examples of the method for alkali treatment include a method in which cellulose fiber containing an ester of phosphorus-oxo acid and so on is immersed in an alkali solution.

The alkali compound contained in the alkali solution may be an inorganic alkali compound or an organic alkali compound. Examples of the inorganic alkali compound include hydroxides of alkali metals or alkaline earth metals, carbonates of alkali metals or alkaline earth metals, and phosphorus-oxo acid salts of alkali metals or alkaline earth metals. Further, examples of the hydroxides of alkali metals include lithium hydroxide, sodium hydroxide and potassium hydroxide etc. Further, examples of the hydroxides of alkaline earth metals include calcium hydroxide. Examples of the carbonates of alkali metals include lithium carbonate, lithium hydrogen carbonate, potassium carbonate, potassium hydrogen carbonate, sodium carbonate and sodium hydrogen carbonate. Examples of the carbonates of alkaline earth metals include calcium carbonate. Examples of the phosphorus-oxo acid salts of alkali metals include lithium phosphate, potassium phosphate, trisodium phosphate and disodium hydrogen phosphate. Examples of the phosphates of alkaline earth metals include calcium phosphate and calcium hydrogen phosphate.

Examples of the organic alkali compounds include ammonia, aliphatic amines, aromatic amines, aliphatic ammonium, aromatic ammonium, heterocyclic compounds, and hydroxides, carbonates and phosphates thereof. Specific examples thereof include ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethylammonium hydroxide, tetraethylammonium hydroxide, tetrapropylammonium hydroxide, tetrabutylammonium hydroxide, benzyltrimethylammonium hydroxide, pyridine, N, N-dimethyl-4-aminopyridine, ammonium carbonate, ammonium hydrogen carbonate and diammonium hydrogen phosphate.

The solvent of the alkali solution may be either water or an organic solvent, but is preferably a polar solvent (a polar organic solvent such as water or alcohol), more preferably an aqueous solvent containing at least water.

The pH of the alkali solution at 25° C. is preferably 9 or more, more preferably 10 or more, especially preferably 11 to 14. When the pH is 9 or more, the yield of fine cellulose fiber is increased. However, when the pH is more than 14, the handleability of the alkali solution is deteriorated.

(Washing)

Cellulose fiber into which an ester of phosphorus-oxo acid and so on have been introduced is washed prior to fibrillation. By washing the cellulose fiber, byproducts and unreacted substances can be washed away. In addition, when the washing precedes alkali treatment in pretreatment, the use amount of the alkali solution in the alkali treatment can be reduced.

The washing of cellulose fiber can be performed using, for example, water, an organic solvent or the like.

(Fibrillation)

Cellulose fiber containing an ester of phosphorus-oxo acid and a carbamate are fibrillated (micronized) after washing. By the fibrillation, pulp fiber is microfibrillated into fine cellulose fiber (cellulose nanofiber).

For fibrillating cellulose fiber, it is preferable to form the cellulose fiber into a slurry. The solid concentration of the slurry is preferably 0.1 to 20% by mass, more preferably 0.5 to 10% by mass, especially preferably 1.0 to 5.0% by mass. When the solid concentration is within the above-described range, the cellulose fiber can be efficiently fibrillated.

Fibrillation of cellulose fiber can be performed using one or more means selected from, for example, homogenizers such as high-pressure homogenizers and high-pressure homogenizing apparatuses, millstone-type friction machines such as grinders and mills, refiners such as conical refiners and disc refiners, and various bacteria. However, it is preferable to perform fibrillation of cellulose fiber using an apparatus and method for micronization with a water flow, particularly a high pressure water flow. According to the apparatus and method, the resulting fine cellulose fiber has very high dimensional uniformity and dispersion uniformity. On the other hand, for example, when a grinder that grinds the fiber between rotating grindstones is used, it is difficult to uniformly micronize cellulose fiber, and in some cases, fiber lumps that cannot be fibrillated remain in some parts.

Examples of the grinder to be used for fibrillating cellulose fiber include Masscolloider from MASUKO SANGYO CO., LTD. In addition, examples of the apparatus for micronization with a high-pressure water flow include Star Burst (registered trademark) from SUGINO MACHINE LIMITED CO., LTD. and Nanovater (registered trademark) from Yoshida Kikai Co., Ltd. In addition, examples of the high-pressure rotating homogenizer to be used for fibrillating cellulose fiber include CLEARMIX-11S manufactured by M Technique Co., Ltd.

In addition, the present inventors have found that when cellulose fiber is fibrillated by grinding the cellulose fiber between rotating grindstones and cellulose fiber is fibrillated by micronization with a high-pressure water flow, and each fiber obtained is observed with a microscope, the fiber obtained by micronization with a high-pressure water flow has a more uniform fiber width.

It is preferable that fibrillation with a high-pressure water flow is performed by a method in which a dispersion of cellulose fiber is pressured at, for example, 30 MPa or more, preferably 100 MPa or more, more preferably 150 MPa or more, especially preferably 220 MPa or more (high pressure condition) by a pressurization machine, jetted from a nozzle having a hole diameter of 50 μm or more, to decompress so that the pressure difference is 30 MPa or more, preferably 80 MPa or more, more preferably 90 MPa or more (decompression condition). Pulp fiber is fibrillated due to a cleavage phenomenon caused by this pressure difference. When the pressure in the high pressure condition is low or when the difference in pressure between the high pressure condition and the decompression condition is small, fibrillation efficiency is reduced, and thus it is necessary to repeatedly perform fibrillation (jet the dispersion from the nozzle) for obtaining a desired fiber width.

It is preferable to use a high-pressure homogenizer as an apparatus for performing fibrillation with a high-pressure water flow. The high-pressure homogenizer refers to a homogenizer having an ability to jet a cellulose fiber slurry at a pressure of, for example, 10 MPa or more, preferably 100 MPa or more. When cellulose fiber is treated with a high-pressure homogenizer, collision between cellulose filaments, the pressure difference, micro-cavitation and the like act to effectively fibrillate cellulose fiber. Therefore, the number of fibrillation treatments can be reduced to enhance production efficiency of fine cellulose fiber.

The high-pressure homogenizer is preferably one that causes counter collision of the cellulose fiber slurry in a straight line. Specific examples thereof include counter collision-type high pressure homogenizers (Microfluidizer/MICROFLUIDIZER (registered trademark), wet jet mill). In this apparatus, two upstream flow channels are formed so that counter collision of the pressurized cellulose fiber slurry occurs at a junction. Further, the cellulose fiber slurry collides at the junction, and the collided cellulose fiber slurry flows out from a downstream channel. The downstream channel is perpendicular to the upstream channel, and the upstream channel and the downstream channel form a T-shaped channel. When such a counter collision-type high-pressure homogenizer is used, energy given by the high-pressure homogenizer is maximally converted into collision energy, so that cellulose fiber can be more efficiently fibrillated.

It is preferable to fibrillate cellulose fiber so that the resulting fine cellulose fiber shows the above-described desired values or grades for the average fiber width, average fiber length, water holding degree, the degree of crystallinity, the peak value of pseudo particle size distribution and the pulp viscosity.

EXAMPLES

Examples of the present invention will now be described.

Tests were conducted in which phosphorus-oxo acid (sodium hydrogen phosphate or sodium hydrogen phosphite) and urea were added to cellulose fiber, and the mixture was heated and washed, and fibrillated to produce fine cellulose fiber. Needle bleached kraft pulp was used as the cellulose fiber. In addition, the fibrillation was performed using a high pressure homogenizer. Further, beating was performed on phosphorus-oxo acid-modified pulp at a rotation number of 9,200 using a PFI mill.

The addition amounts of phosphorus-oxo acid and urea, the temperature and time for heating, and the number of fibrillation passes are as shown in Table 1. The physical properties and evaluation results of the obtained fine cellulose fiber are shown in Table 2. The method for evaluation of the B-type viscosity and the method for evaluation of the light transmittance are as described above. In addition, yellowing was visually determined, and evaluated on the basis of the following criteria.

(Yellowing)

⊙: transparent or white

○: ivory

Δ: light yellow x: evidently yellow

−: Not sufficiently fibrillated, and not evaluated

In Test Example 6, it was not possible to measure the B-type viscosity and the transmittance because cellulose fiber was not sufficiently fibrillated, and was caught in the high-pressure homogenizer. However, it is considered that when the heating time is longer (than 120 minutes), the cellulose fiber can be sufficiently fibrillated.

TABLE 1

| | Addition amount | | heating | | Fibrillation |
|---|---|---|---|---|---|
| | Phosphorus-oxo acid kg/PT | Urea kg/PT | Temperature ° C. | Time Minutes | Number of passes |
| Test Example 1 | 940 | 1,080 | 100 | 120 | 1 |
| Test Example 2 | 940 | 1,080 | 130 | 120 | 1 |
| Test Example 3 | 940 | 1,080 | 140 | 120 | 1 |
| Test Example 4 | 940 | 1,080 | 170 | 120 | 1 |
| Test Example 5 | 1,500 | 1,080 | 150 | 120 | 1 |
| Test Example 6 | 940 | 60 | 150 | 120 | — |

TABLE 2

| | Introduced (modified) | Phosphorus-oxo group Degree of substitution DS | Carbamate group Degree of substitution DS | Carbamate group Introduction amount mmol/g | B-type viscosity CP | Transmittance % | Yellowing Sensory evaluation |
|---|---|---|---|---|---|---|---|
| Test Example 1 | Phosphoric acid ester | 0.08 | 0.03 | 0.21 | 2,900 | 18.2 | ○ |
| Test Example 2 | Phosphoric acid ester | 0.39 | 0.11 | 0.65 | 5,700 | 38.6 | ○ |
| Test Example 3 | Phosphoric acid ester | 0.41 | 0.11 | 0.67 | 15,200 | 40.7 | ○ |
| Test Example 4 | Phosphoric acid ester | 0.64 | 0.14 | 0.87 | 12,400 | 42.1 | ○ |
| Test Example 5 | Phosphorous acid ester | 0.20 | 0.15 | 0.94 | 18,800 | 56.2 | ⊙ |
| Test Example 6 | Phosphoric acid ester | 0.12 | 0.02 | 0.14 | — | — | — |

INDUSTRIAL APPLICABILITY

The present invention can be used as fine cellulose fiber and a method for producing the fine cellulose fiber.

The invention claimed is:

1. Fine cellulose fibers in which a part of a plurality of hydroxy groups of cellulose fibers are
substituted with a functional group represented by the following structural formula to introduce an ester of phosphorous acid, and
substituted with a carbamate group to introduce a carbamate:

[Structural formula]

wherein, in structural formula, α is any one of the following: R, NHR, or not present, wherein R is one of a hydrogen atom, a saturated linear hydrocarbon group, a saturated branched hydrocarbon group, a saturated cyclic hydrocarbon group, an unsaturated linear hydrocarbon group, an unsaturated branched hydrocarbon group, an aromatic group and a derivative group thereof, and β is a cation of an organic substance or an inorganic substance;
wherein a degree of substitution of the plurality of hydroxy groups in the cellulose fibers by the carbamate group ranges from 0.02 to 0.15, wherein the degree of substitution is an average number of substitutions of the functional group represented by the structural formula or the carbamate group with respect to one glucose unit in the cellulose fibers;
wherein a light transmittance of the fine cellulose fibers in a solution having a solid content of 0.2% is at least 40.0%; and
wherein a B-type viscosity of a dispersion of the fine cellulose fibers having a concentration of 1% by mass ranges from 10 to 300,000 cps.

2. The fine cellulose fibers according to claim 1, wherein the degree of substitution with the functional group represented by the structural formula is 0.01 to 0.64.

3. A method for producing fine cellulose fibers, comprising:
providing cellulose fibers having a plurality of hydroxy groups;
adding an additive (A) including sodium hydrogen phosphite and an additive (B) including at least one of urea and a urea derivative to the cellulose fibers;
heating the mixture at 100 to 210° C.;
washing the mixture; and
fibrillating the mixture;
wherein the additive (B) is added in an amount of 0.01 to 100 mol based on 1 mol of the additive (A);
wherein the heating is performed until a degree of substitution of the plurality of hydroxy groups in the cellulose fibers by a carbamate group ranges from 0.02 to 0.15, wherein the degree of substitution is an average number of substitutions of the carbamate group with respect to one glucose unit in the cellulose fibers; and
wherein a light transmittance of the fine cellulose fibers in a solution having a solid content of 0.2% is at least 40.0%.

4. The method for producing fine cellulose fibers according to claim 3, wherein the heating is performed at a pH of 3 to 12.

* * * * *

UNITED STATES PATENT AND TRADEMARK OFFICE
CERTIFICATE OF CORRECTION

PATENT NO. : 11,441,243 B2
APPLICATION NO. : 16/609984
DATED : September 13, 2022
INVENTOR(S) : Ikko Matsusue It is certified that error appears in the above-identified patent and that said Letters Patent is hereby corrected as shown below:

In the Claims

In Column 13, Line 40, of Claim 1:
"in structural formula, a is"
Should read:
--"in structural formula, α is"--

Signed and Sealed this
Eighth Day of November, 2022

Katherine Kelly Vidal
*Director of the United States Patent and Trademark Office*